(12) United States Patent
Katsilieris et al.

(10) Patent No.: US 11,320,532 B2
(45) Date of Patent: May 3, 2022

(54) COORDINATED DETECTING OF OBJECTS IN AN AIRSPACE

(71) Applicant: AIRBUS DEFENCE AND SPACE GMBH, Taufkirchen (DE)

(72) Inventors: Fotios Katsilieris, Taufkirchen (DE); Bernhard Krach, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 345 days.

(21) Appl. No.: 16/517,170

(22) Filed: Jul. 19, 2019

(65) Prior Publication Data
US 2020/0081115 A1   Mar. 12, 2020

(30) Foreign Application Priority Data

Sep. 7, 2018   (DE) .......................... 102018121821.4

(51) Int. Cl.
*G01S 13/72*   (2006.01)
*G01S 13/04*   (2006.01)

(52) U.S. Cl.
CPC .............. *G01S 13/72* (2013.01); *G01S 13/04* (2013.01)

(58) Field of Classification Search
CPC .......... G01S 13/04; G01S 13/72; G01S 13/87; G01S 13/88; G01S 13/426; G01S 13/726; G01S 13/003; G01S 13/933; F41G 7/2286
USPC .................................. 342/72, 95, 96, 62, 158
See application file for complete search history.

(56) References Cited

U.S. PATENT DOCUMENTS

| | | | | | |
|---|---|---|---|---|---|
| 3,833,904 | A | * | 9/1974 | Gebhardt | G01S 13/106 342/83 |
| 3,858,206 | A | * | 12/1974 | Scheidler | H01Q 25/00 342/83 |
| 6,690,318 | B1 | * | 2/2004 | Tsunoda | G01S 7/003 342/59 |
| 8,854,255 | B1 | * | 10/2014 | Ehret | G01S 13/538 342/160 |
| 9,176,223 | B2 | * | 11/2015 | Derham | G01S 7/412 |
| 9,501,055 | B2 | * | 11/2016 | Kolanek | |
| 10,228,689 | B2 | * | 3/2019 | Kolanek | G01S 13/883 |

(Continued)

FOREIGN PATENT DOCUMENTS

EP    3 584 600 A1   12/2019

OTHER PUBLICATIONS

Radar Detection Probabilities and Their Calculation, David A Shnidman, IEEE 1995 (Year: 1995).*

(Continued)

*Primary Examiner* — Erin F Heard
*Assistant Examiner* — Michael W Justice
(74) *Attorney, Agent, or Firm* — Jenkins, Wilson, Taylor & Hunt, P.A.

(57) ABSTRACT

The present disclosure is concerned with a method for searching a search area, a missile, and a missile formation. According to the method, in each case at least one radar is arranged in at least two missiles, wherein the method involves: determining a total search time for searching the search area, splitting the search area into at least two search subareas, and searching the at least two search subareas by means of the respective radar of the at least two missiles. The at least two missiles carry out the searching cooperatively, wherein the search subareas are chosen such that a detection probability is maximized.

10 Claims, 4 Drawing Sheets

(56) References Cited

U.S. PATENT DOCUMENTS

| | | | |
|---|---|---|---|
| 10,948,909 B2* | 3/2021 | Kolanek | F41G 7/306 |
| 2006/0114324 A1* | 6/2006 | Farmer | H04B 7/18506 |
| | | | 348/144 |
| 2013/0176161 A1* | 7/2013 | Derham | G01S 7/36 |
| | | | 342/27 |
| 2016/0048129 A1* | 2/2016 | Kolanek | 701/2 |
| 2017/0300047 A1* | 10/2017 | Kolanek | F41G 7/306 |
| 2019/0258241 A1* | 8/2019 | Kolanek | F41H 11/02 |
| 2019/0383923 A1* | 12/2019 | Katsilieris | G01S 13/933 |

OTHER PUBLICATIONS

Finn et al., "Design Challenges for an Autonomous Cooperative of UAVs," Information, Decision and Control, IDC '07, IEEE, pp. 160-169 (Feb. 2007).

Gusrialdi et al., "Coverage control for mobile networks with limited-range anisotropic sensors," 47th IEEE Conference on Decision and Control, CDC 2008, Piscataway, NJ, USA, pp. 4263-4268 (Dec. 2008).

European Search Report for Application No. 19186908.0 dated Jan. 20, 2020.

* cited by examiner

COORDINATED DETECTING OF OBJECTS IN AN AIRSPACE

CROSS-REFERENCE TO PRIORITY APPLICATION

This application claims the benefit of, and priority to, German patent application number 102018121821.4, filed on Sep. 7, 2018. The content of the referenced application is incorporated by reference herein.

TECHNICAL FIELD

Embodiments of the subject matter described herein relate generally to a method for searching a search area, a missile, and a missile formation.

BACKGROUND

Modern aircraft are for the most part equipped with a large number of sensors that have an important role for the aircraft and/or for the pilot in order to carry out a mission with the best possible outcome.

One such sensor is a radar, for example, which is also one of the most used sensors for position image recognition. A radar can be used to identify or detect objects or targets at long ranges. The properties of a radar are less affected by the weather than a camera sensor, for example. Target detection/ tracking by means of radar is for example still possible even when it is no longer possible with imaging electrooptical or infrared sensors on account of IMC (Instrument Meteorological Conditions).

Aircraft were often equipped with mechanically swiveling radar antennas. The result of this was that the search of an airspace could be carried out using a pair of parameters, which were optimizable. Usually, the pilot defines the airspace that is supposed to be searched, for the most part as an angle statement and a half-width, and the range within which a target of defined size is supposed to be detected. On the basis of this information, the radar optimizes the waveform that is then transmitted. With such an approach, the search pattern and the scanning of the airspace are stipulated to the greatest possible extent and are dependent only on the size of the airspace that is being searched.

BRIEF SUMMARY

It is now an object of the present disclosure to improve the search of an airspace such that fast and efficient position image recognition, for example for a pilot, can be ensured.

This object is achieved by a method, a missile and a missile formation according to one of the independent claims. It should be pointed out that the aspects below that are described pertain to the method, to the missile and to the missile formation.

According to the disclosure, a method for searching a search area is specified, wherein in each case at least one radar is arranged in at least two missiles. The method comprises: a) determining a total search time for searching the search area, b) splitting the search area into at least two search subareas, c) searching the at least two search subareas by means of the respective radar of the at least two missiles, wherein the at least two missiles carry out the searching cooperatively, wherein the search subareas are chosen such that a detection probability is maximized.

A radar is configured to detect various objects. In particular, the radar can perform the searching of a search area, which for the most part is a volume (of air).

According to the disclosure, a search area is searched in a prescribed total search time such that the detection probability for objects or targets in the search area is at a maximum. Also disclosed is an improved detection probability for finding targets or objects in a three-dimensional search area within a prescribed time. As few as possible or no targets or objects remain undetected. The searching of the search area is of the greatest importance for the position image recognition by a pilot, for example. Undetected objects or targets can become a problem not only on account of potential hostility during a mission, but also on account of a possible risk of collision in the airspace. Position image recognition denotes the determination of the location or speed of other targets or objects.

Radar sensors, also called radar for short herein, are sensors that the missile has, possibly besides further sensors such as a camera, etc. Such a radar may be equipped with active electronic actuation of the individual elements of the radar (active electronically scanned array antennas (AESA)). Such a radar can steer the radar beam almost instantaneously for different solid angles (a solid angle is specified as horizontal and vertical angles, also called azimuth and elevation), so that adaptive beam orientation is possible.

A missile comprises any type of flying device having any type of propulsion. By way of example, aircraft, unmanned aircraft, known as UAVs ("unmanned aerial vehicle"), drones, guided missiles, rockets or helicopters.

The search effort for detecting an object or a target in the search area by means of two or more missiles is performed cooperatively. That is to say that coordinated searching of the search area takes place.

The search area is a volume (of air) that can be covered by the at least one radar of the respective missile. The search area can be specified on the basis of horizontal and vertical angles. It is also possible to specify the search area on the basis of three-dimensional coordinates.

Often, the missiles are in a flight formation in the airspace flown through. The search area will be in the surroundings of both missiles, for example. Preferably, the search area will be in front of the missiles, as seen in the direction of flight.

The area to be searched in the airspace, that is to say the search area for the missiles, is split into at least two search subareas. In some examples, the number of search subareas corresponds to the number of missiles. The at least two search subareas are searched by the respective radar of the missile, wherein in each case one missile searches at least one search subarea.

The searching of the search subareas or of the search area is cooperative searching. The search effort is distributed such that the same areas of the search area do not have to be searched more often. In the case of two missiles having one radar each, the search area is split into two search subareas, for example. The two missiles examine their respective search subarea at the same time or substantially at the same time. In some examples, the method is performed by at least two missiles that are in the air.

The search subareas are chosen such that a detection probability is maximized. This ensures that the best split of the search area is found and that repeated searching of the same area is not performed. The search area is searched in the prescribed total search time. By way of example, the detection probability for different splits of the search area into search subareas can be maximized for a prescribed total search time. For a particular split of the search area into search subareas, the detection probability is at a maximum.

The method according to the disclosure can be used to prevent there being undetected targets or objects in a search area after searching that occur for example when the search area is split in a naïve manner, for example into equal shares. This applies in particular if the search area extends at arbitrary horizontal and vertical angles in the airspace.

In some examples of the method, the total search time is the cooperative total search time needed by the at least two missiles in order to search the search area. The search time is the time that the radar beam needs in order to illuminate the search subarea and to receive the echo. In some examples, the time needed in order to process the received signal (echo) in order to spot objects or targets will also be taken into consideration.

According to one example, the detection probability is maximized on the basis of an object of prescribed size at a prescribed distance. The size and/or the distance is predetermined in some examples. This allows a maximum detection probability for different objects at different distances.

According to one example, the detection probability for the at least two search subareas is the same. An optimum split for the search subareas is obtained for the same detection probability for the at least two search subareas. The split of the search subareas is chosen such that the detection probability of the search area is maximized. The search subareas are different from one another in this case, for example the search subareas are spatially different from one another. By way of example, the size of the search subareas is different. If the detection probability in one subarea is increased, the detection probability in the at least one other search subarea falls at the same time.

According to one example, the total search time is prescribable or predefined. By way of example, the pilot can prescribe the total search time. If need be, the total search time can be changed or matched to the respective position image recognition.

According to one example, the search subareas have substantially no overlap. In some examples, the search subareas have no overlap. Therefore, the coordination of the search becomes simpler and the communication requirement between the missiles is low. There are examples in which the search subareas overlap minimally. A minimal or non-existent overlap avoids repeated searching of a (sub)area, and the search effort for searching a search area can be kept low. Gaps in the search area are also avoided, while at the same time the detection probability for targets or objects in the search area is at a maximum.

According to one example, the search area is prescribable or alterable. By way of example, the pilot can prescribe the search area by setting a horizontal or vertical angle and the associated (half)width (also referred to as (half)width in azimuth and elevation). If need be, the search area can be matched to the respective position image recognition. In some examples, the search area is predefined.

According to one example, the splitting of the search area into search subareas changes according to the movement and/or the trajectory of the at least two missiles.

According to one example, the splitting of the search area into search subareas is continually adapted according to the movement and/or the trajectory of the at least two missiles. The search area is prescribed by means of three-dimensional coordinates, for example. The missiles move in the search area, which means that the horizontal and vertical angles (angles of azimuth and elevation) and the angle widths thereof change.

According to one example, a search subarea is determined based on a horizontal angle, a vertical angle and associated angle widths, or based on three-dimensional coordinates. It is also possible for all search subareas to be determined on the basis of horizontal angle, vertical angle. In some examples, it is possible for the one or more search subareas to be determined by means of three-dimensional coordinates, for example the corners or the surfaces of the search subarea are specified.

According to one example, one of the at least two missiles assigns the search subarea to be searched to the at least one other missile. This allows central control of the method to be achieved (centralized method). The assignment can be carried out by any of the missiles. In some examples, one of the missiles is instructed in this regard. Central control allows the search effort to be optimized.

According to one example, the at least two missiles each independently of one another stipulate the search subarea that is supposed to be searched by the radar of the missile. The independent assigning of the area to be searched by the respective missile achieves local control (decentralized method). The area to be searched, which the individual missile assigns to itself, may be identical to the subarea if the search area is split into different search subareas by a missile on the basis of central control.

According to one example, complete searching of the search area is ensured. In other words, the searching of the search area is completed in the total search time with a maximum detection probability.

According to one aspect of the disclosure, there is provision for a missile that comprises at least one radar and a process unit. The process unit is configured to perform the method according to the disclosure.

According to one aspect of the disclosure, there is provision for a missile formation that comprises at least two missiles, wherein the missile formation is configured to cover a search area in an airspace.

According to one aspect of the disclosure, the coordinated searching of a search area using at least two missiles, each of which has at least one radar arranged in it, is of great benefit. In particular, the method results in a time saving when searching a 3 dimensional search area. If the search area is at arbitrarily prescribed angles of azimuth and elevation (horizontal and vertical angles) and the associated angle widths, then a simple split of the search area as in the prior art, for example halving of the search area, leads to significant time delays in the total search time. Such time delays are almost concluded in the case of the method according to the disclosure. The search subareas do not overlap (minimal overlap of the search subareas, for example there may be a common boundary for the search subareas in some examples). The method splits the search area into the best possible subareas, so that the total search time needed for cooperatively searching the search area in order to ensure a desired detection probability is minimal. In other words, the time needed in order to search a search area is minimized, with a minimum detection probability for targets or objects of predetermined size at a predetermined distance being ensured. A time saving for searching a three-dimensional volume that can be prescribed by the pilot is the result. In particular in the case of an arbitrarily prescribed search area, this leads to more effective and above all distinctly faster searching.

It should be pointed out that the features of the exemplary embodiments of the method also apply to embodiments of the missile and of the missile formation, and vice versa. Additionally, it is also possible to freely combine those features for which this is not explicitly mentioned.

These and further aspects of the disclosure will become apparent by allusion and with reference to the embodiments that follow.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Exemplary embodiments of the invention are discussed more specifically below on the basis of the accompanying drawings, in which.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
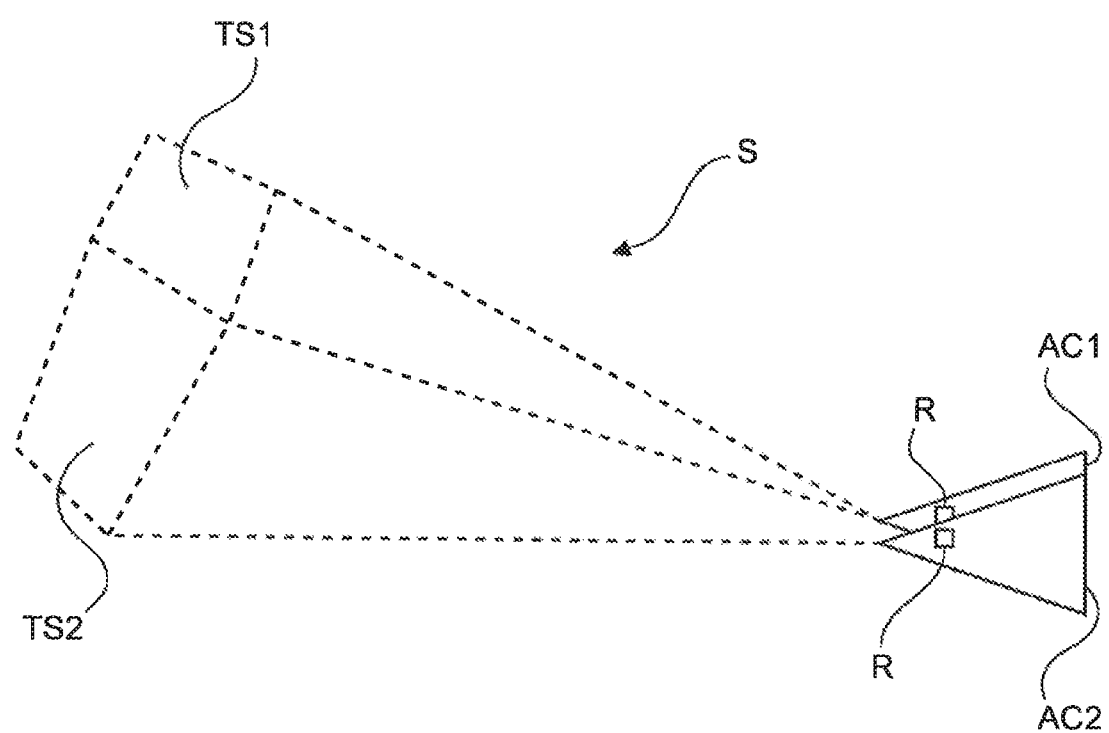
FIG. 1 shows two missiles and a search area in an outline form.

FIG. 1 shows two missiles AC1, AC2 and a search area S in outline form. The two missiles AC1, AC2 are in the air. Each missile AC1, AC2 has a radar R. The search area S is a three-dimensional area that is in the surroundings of the missiles AC1, AC2. The missiles AC1, AC2 fly as a flight formation in some exemplary embodiments.

The search area S is split into two search subareas TS1, TS2 that are searched by the radar R of the respective missile AC1, AC2. The search subareas TS1, TS2 have no overlap. The searching of the subareas TS1, TS2 is carried out cooperatively. As described in the figures that follow, the search subareas TS1, TS2 comprise the whole search area S.

Figure 2:
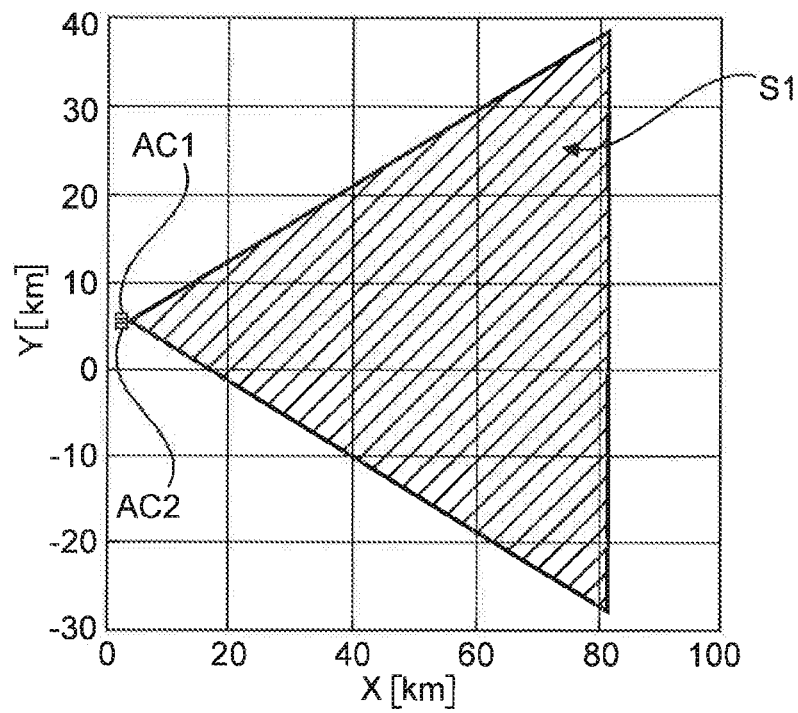
FIG. 2 shows a search area to be searched in a coordinate system in exemplary fashion.
Figure 3:
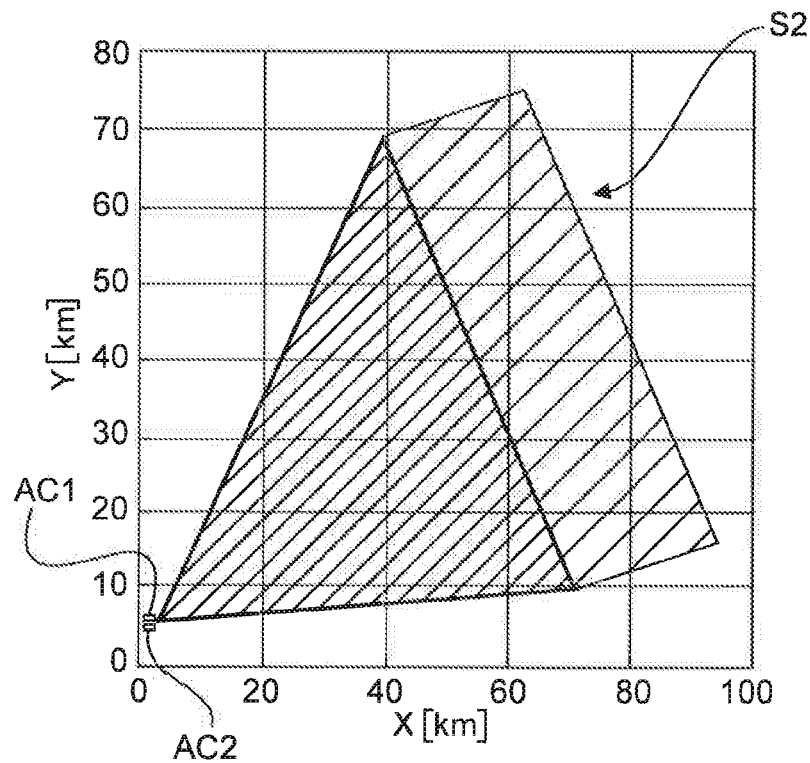
FIG. 3 shows a search area to be searched in a coordinate system in exemplary fashion.

FIGS. 2 and 3 each show a search area S1 or S2. The missiles AC1, AC2 fly at an altitude of 10 km and are 500 m away from one another on the Y axis shown. For reasons of depictability, the missiles AC1, AC2 are barely distinguishable from one another. The numerical statements are exemplary. In what follows, the search area or the search subareas is/are specified by means of angle of azimuth $\theta$ (horizontal angle) and angle of elevation $\varphi$ (vertical angle) and angle half-width $\theta$-S1, $\theta$-S2 for the angle of azimuth and $\varphi$ S1, $\varphi$-S2 for the angle of elevation.

In FIG. 2, the search area S1 is supposed to be searched by the respective radar R of the missiles AC1, AC2, said radar being centered at angle of azimuth $\theta=0°$ and angle of elevation $\varphi=0°$, that is to say directly in front of the missiles AC1, AC2, at an angle width $\theta$-S1 of from −25° to 25° for the angle of azimuth and $\varphi$-S1 of from −25° to 25° for the angle of elevation. Such a search area is usual to avoid collisions with other missiles.

In FIG. 3, the search area S2 is supposed to be searched by the respective radar R of the missiles AC1, AC2, said radar being centered at angle of azimuth $\theta=30°$ and angle of elevation $\varphi=20°$, at an angle width $\theta$-S1 of from 5° to 55° for the angle of azimuth and $\varphi$-S1 of from 5° to 45° for the angle of elevation. Such a search area represents a situation in which the pilots have been informed that possibly threatening targets or objects are approaching. In the case of unmanned missiles, an applicable device or system of the missiles receives the information. In other embodiments, it is possible for a ground station to receive the information.

In the two FIGS. 2 and 3, the search area S1, S2 is supposed to be searched within a total search time, for a given radar cross section a and range, with a detection probability PD being maximized. According to the method, the search area S1 or S2 is split into two search subareas that are searched cooperatively by the respective radar R of the two missiles AC1, AC2. The search subareas in this case have no overlap. Each search subarea has a detection probability.

In this exemplary embodiment, a split for the search area S1, S2 is thus supposed to be found, so that the detection probability PD_TS1, PD_TS2 for the two search subareas TS1, TS2 is maximized for searching the search area S1, S2. Optimally, the detection probability PD_TS1, PD_TS2 for the two search subareas TS1, TS2 is the same. In this case, the total search time for searching the search area S1, S2 is predetermined and can be prescribed or predefined.

The method of splitting the search area S1 or S2 is performed for different combinations of in each case two search subareas TS1, TS2, and the detection probability PD for searching the search area S1 or S2 is ascertained. In order to obtain the best split for the search area S1, S2, in each case the angle of azimuth range or the angle of elevation range is altered in this example. Each missile AC1, AC2 searches the whole elevation range but only part of the azimuth range, or the whole azimuth range but only part of the elevation range. In other examples, another combination can also be taken as a basis for the split.

For each combination, the detection probability PD, PD_TS1, PD_TS2 of the two search subareas TS1, TS2 is ascertained. The combination of the two search subareas TS1, TS2 for a maximum detection probability PD is used for the searching of the search area S1 or S2 that then follows. In this exemplary embodiment, the detection probability PD_TS1, PD_TS2 for the two search subareas TS1, TS2 is the same.

In this example, the geometric split found based on a horizontal angle, vertical angle and a distance, the maximum detection probability PD for an object or target and the predetermined total search time lead to reliable searching of the search area S1 or S2 and hence to a reliable position image recognition. By way of example, an imminent risk of collision can be avoided. There is also the assurance that the searching of the search area S1, S2 is completed fully within the total search time.

Figure 4:
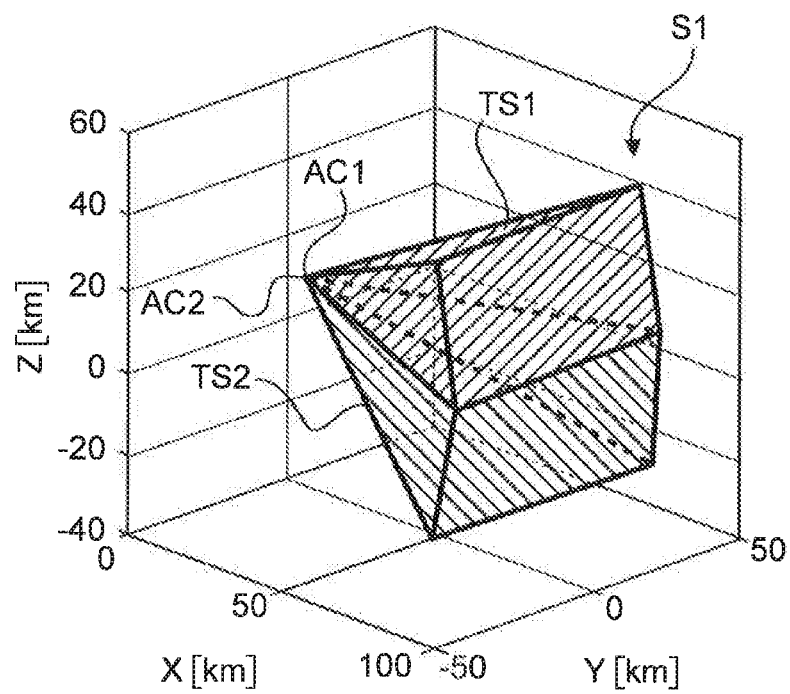
FIG. 4 shows the split of the search area S1 from FIG. 2 into in each case two search subareas TS1, TS2.
Figure 5:
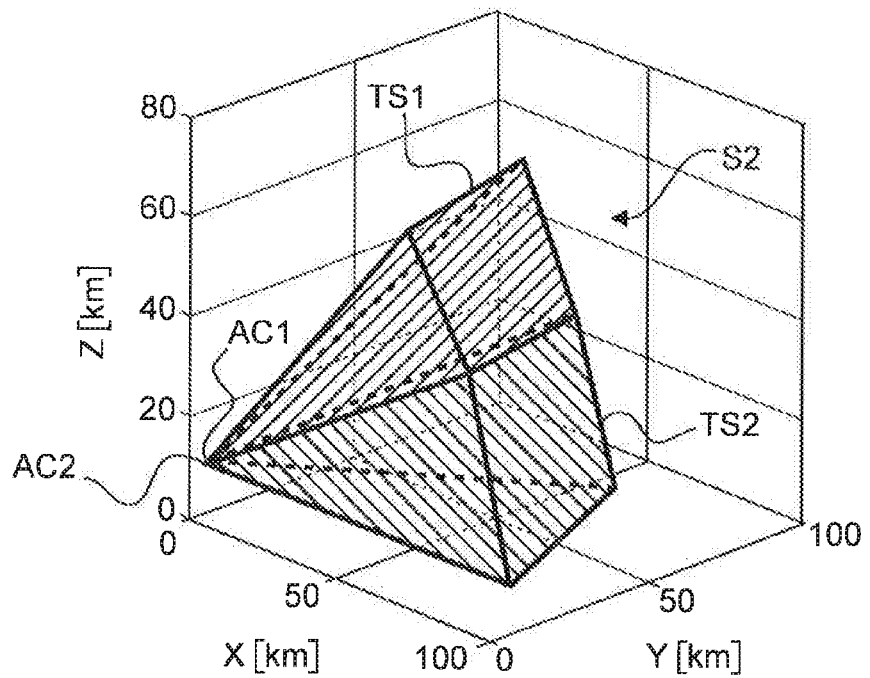
FIG. 5 shows the split of the search area S2 from FIG. 3 into in each case two search subareas TS1, TS2.

FIGS. 4 and 5 show the split of the search area S1, S2 from FIGS. 2, 3 into in each case the two search subareas TS1, TS2. Each search subarea TS1, TS2 is associated with one of the missiles AC1, AC2 and is searched by the radar R of the respective missile AC1, AC2.

FIG. 4 reveals a symmetrical split into the search subareas TS1, TS2. Such a split is intuitive and simple. The split ratio for the elevation is 25°/25° for the search subareas TS1, TS2. The search area S1 is as described in FIG. 2.

FIG. 5 reveals a split into the search subareas TS1, TS2. The split ratio for the elevation is 27.8°/22.2° for the search subareas TS1, TS2. The search area S2 is as described in FIG. 3.

The figures show that when a search area is symmetrically around the antenna normal of the radar sensor (cf. FIG. 2), a symmetrical split for the search subareas TS1, TS2 leads to a maximum detection probability PD for targets or objects. If, by contrast, the search area is not symmetrical, then a symmetrical split leads to a detection probability PD that is less than the maximum detection probability PD. In a further example, the splitting of the search area S1, S2 into the two search subareas TS1, TS2 changes with the movement or the trajectory of the missiles. In some examples, the split into the search subareas TS1, TS2 is continually adapted.

In some embodiments, the method is performed in an applicable apparatus for example of the missile AC1. This requires only the position of the other missile AC2 (cf. also FIG. 1). Said missile then assigns the search subarea TS2 to be searched to the other missile AC2. By way of example, only the following values are transmitted to the other missile AC2: azimuth and elevation center line and the half-width of the search subarea TS2 assigned to the other missile AC2. This achieves central control of the method.

However, it is also possible for the missiles AC1, AC2 to each independently of one another stipulate the search subarea TS1, TS2 that is supposed to be searched by the radar R of the missile AC1, AC2. The independent assigning of the search subarea to be searched TS1, TS2 by the respective missile AC1, AC2 achieves local control.

The missiles AC1, AC2 described are equipped as appropriate for performing the method and for searching the search area. By way of example, such a missile also has a process unit for performing the method.

Figure 6:
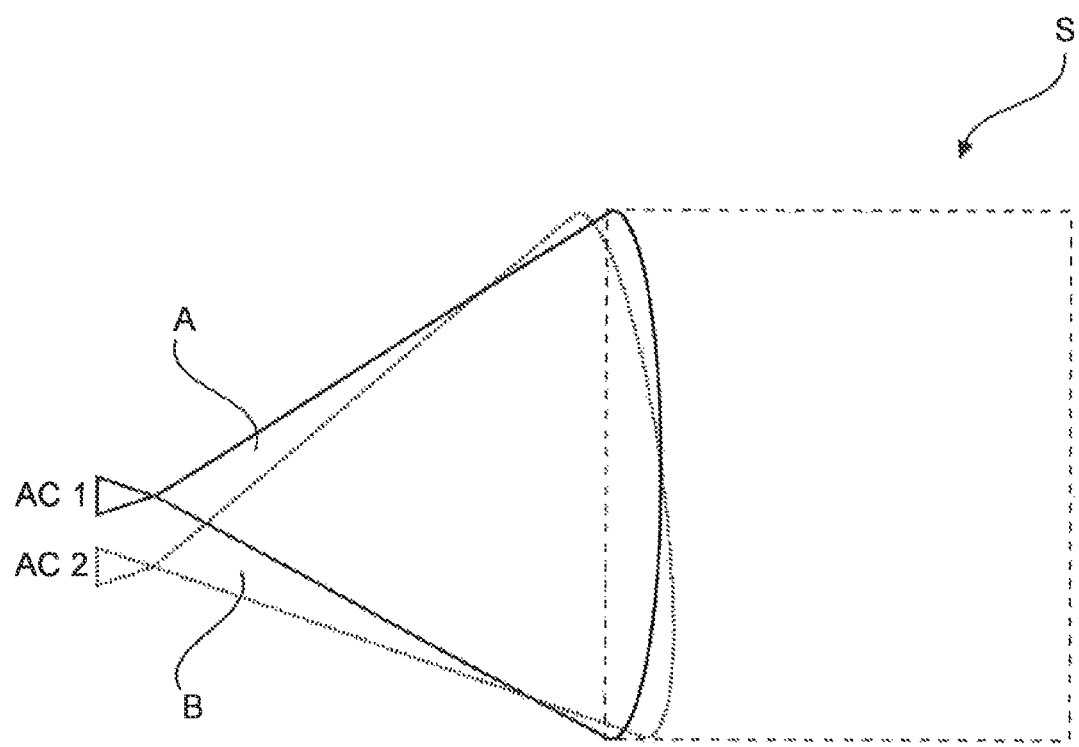
FIG. 6 shows an example based on the prior art.

FIG. 6 shows the searching of an area S in an airspace based on the prior art. The search is carried out noncooperatively. In particular, the areas A, B searched by the respective missile AC1, AC2 are split such that these areas A, B largely overlap, as shown in FIG. 6. This does not lead to a maximum detection probability within a prescribed total search time for searching the area S and leads to less reliable position image recognition.

The exemplary embodiments described above can be combined in different ways. In particular, aspects of the method can also be used for embodiments of the apparatuses and use of the apparatuses, and vice versa. The depictions in the figures are schematic and not to scale. Where the same reference signs are used in different figures in the description of the figures that follows, these denote identical or similar elements. Identical or similar elements may also be denoted by different reference signs, however.

Additionally, it should be pointed out that "comprising" does not preclude other elements or steps, and "a" or "one" does not preclude a multiplicity. Furthermore, it should be pointed out that features or steps that have been described with reference to one of the exemplary embodiments above can also be used in combination with other features or steps of other exemplary embodiments described above. Reference signs in the claims are not intended to be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for searching a search area, wherein at least one radar is arranged in each of at least two missiles, the method comprising steps of:
    determining a total search time for searching the search area;
    splitting the search area into at least two search subareas; and
    searching the at least two search subareas by way of the respective radar of the at least two missiles, wherein the at least two missiles carry out the searching cooperatively;
    wherein the search subareas are chosen such that a detection probability, which is based on an object having a minimum radar cross-section at a prescribed distance, is the same between the at least two search subareas; and
    wherein the splitting of the search area into search subareas changes according to movement and/or trajectory of the at least two missiles.

2. The method according to claim 1, wherein the total search time is prescribable or predefined.

3. The method according to claim 1, wherein the search subareas have substantially no overlap.

4. The method according to claim 1, wherein the search area is prescribable or alterable.

5. The method according to claim 1, wherein the splitting of the search area into search subareas is continually adapted according to the movement and/or the trajectory of the at least two missiles.

6. The method according to claim 1, wherein a search subarea is determined based on a horizontal angle, a vertical angle and associated angle widths, or based on three-dimensional coordinates.

7. The method according to claim 1, wherein one of the at least two missiles assigns the search subarea to be searched to the at least one other missile.

8. The method according to claim 1, wherein complete searching of the search area is ensured.

9. A missile, comprising:
    at least one radar; and
    a process unit configured to perform the method according to claim 1.

10. A missile formation comprising at least two missiles according to claim 9, wherein the missile formation is configured to cover a search area in an airspace.

* * * * *